US006938009B1

(12) United States Patent
Herbst et al.

(10) Patent No.: US 6,938,009 B1
(45) Date of Patent: Aug. 30, 2005

(54) DIGITAL COMPUTER SYSTEM AND METHODS FOR A SYNTHETIC INVESTMENT AND RISK MANAGEMENT FUND

(75) Inventors: Anthony F. Herbst, El Paso, TX (US); Wayne F. Perg, Amado, AZ (US)

(73) Assignee: New Market Solutions, LLC, Phoenix, AZ (US)

( * ) Notice: Subject to any disclaimer, the term of this patent is extended or adjusted under 35 U.S.C. 154(b) by 603 days.

(21) Appl. No.: 09/375,817

(22) Filed: Aug. 16, 1999

(51) Int. Cl.[7] .................................................. G06F 17/60

(52) U.S. Cl. ................................. 705/36; 30/31; 30/35; 30/36

(58) Field of Search ............................... 705/35, 36, 37

(56) References Cited

U.S. PATENT DOCUMENTS

| | | | | | |
|---|---|---|---|---|---|
| 4,674,044 | A | | 6/1987 | Kalmus et al. | 364/340 |
| 5,126,936 | A | | 6/1992 | Champion et al. | 364/408 |
| 5,148,365 | A | | 9/1992 | Dembo | 364/402 |
| 5,227,967 | A | | 7/1993 | Bailey | 364/408 |
| 5,799,287 | A | | 8/1998 | Dembo | 705/36 |
| 5,806,048 | A | | 9/1998 | Kiron et al. | 705/36 |
| 5,819,238 | A | * | 10/1998 | Fernholz | 705/36 |
| 5,870,720 | A | | 2/1999 | Chusid et al. | 705/705 |
| 5,875,437 | A | | 2/1999 | Atkins | |
| 5,946,667 | A | * | 8/1999 | Tull, Jr. et al. | 705/36 |
| 6,018,722 | A | | 1/2000 | Ray et al. | 705/36 |
| 6,021,397 | A | * | 2/2000 | Jones et al. | 705/36 |
| 6,035,287 | A | * | 3/2000 | Stallaert et al. | 705/37 |

FOREIGN PATENT DOCUMENTS

WO PCT/US99/05010 3/1999

OTHER PUBLICATIONS

Risk Watch, http://www.algorithmics.com/products/riskwatch1.html.

Herbst, Anthony F. and Nicholas O. Ordway. "Stock Index Futures Contracts and Separability of Returns." *The Journal of Futures Markets*, vol. 4, No. 1, pp. 87–102 (1984).

(Continued)

*Primary Examiner*—Yehdega Retta
(74) *Attorney, Agent, or Firm*—Peter K. Trzyna, Esq.

(57) ABSTRACT

A computer-aided method for implementing at least one synthetic investment fund. The method includes providing a digital electrical computer apparatus including a digital computer having a processor, the processor electrically connected to a memory device for storing and retrieving machine-readable signals, to an input device for converting input information into input electrical data, and to an output device for converting output electrical data into print, the processor programmed to control the apparatus to receive the input data and to produce the output data by steps including: forming a synthetic investment fund by entering, as some of the input information, at least one of the group consisting of an amount of an interest-bearing asset, and an amount of a derivative instrument, and entering a specification of a relationship for the amounts; entering, as some of the input information, respective market prices for the interest-bearing asset and for the derivative instrument; calculating a unit value for each said class of interests in the fund in response to the market prices; and generating output for investor reporting, the output including holding data for each said class of interests in the fund and the unit value for each said class of interests in the fund.

39 Claims, 11 Drawing Sheets

OTHER PUBLICATIONS

Hill, Joanne M. and Humza Naviwala. "Synthetic and Enhanced Index Strategies Using Futures on U.S. Indexes." *The Journal of Portfolio Management*, May 1999, pp. 61–74.

McGinn, Daniel. "The Ultimate Guide to Indexing." *Bloomberg*, Sep. 1999, pp. 66–83.

Miller, Todd and Timothy S. Meckel. "Beating Index Funds with Derivatives." *The Journal of Portfolio Management*, May 1999, pp. 75–87.

Herbst, Anthony F., Joseph P. McCormack, Elizabeth N. West. "Investigation of Lead–Lag Relationship between Spot Stock Indices and Their Futures Contracts." *The Journal of Futures Markets*, vol. 7, No. 4, pp. 373–381 (1987).

PIMCO Funds. "PMCO Stocks Plus Fund." (Aug. 19, 1999) 12 Pages, http://www.pimcofunds.com.

* cited by examiner

Fig. 1

| | Table 1: Recent Index Fund Performance | | | | | | | | | |
|---|---|---|---|---|---|---|---|---|---|---|
| | | | Percentage Returns | | | | | | | |
| | S&P Index Fund Name | Assets ($ Mil) | NAV | QTR | 1YR | 3YRS | 5YRS | 10YRS | DIV YLD% | P/E |
| 1 | VANGUARD Index 500 POR | 48,264.6 | 90.7 | 2.84 | 33.09 | 31.03 | 20.12 | 17.84 | 1.5 | 21.6 |
| 2 | VANGUARD INTL IDX | 15,112.1 | 89.5 | 2.87 | 33.36 | 31.20 | 20.28 | • | 1.2 | 21.5 |
| 3 | Fidelity US EQ | 9,572.8 | 34.98 | 2.81 | 33.04 | 30.84 | 19.98 | • | 1.1 | 21.5 |
| 4 | Fidelity MKT | 3,697.9 | 68.5 | 2.83 | 33.03 | 30.73 | 19.86 | • | 1.4 | 21.4 |
| 5 | VANGUARD INSTL IX | 2,972.0 | 89.56 | 2.87 | • | • | • | • | 0.0 | • |
| 6 | T Rowe Price EQ | 1,833.5 | 26.38 | 2.80 | 32.87 | 30.75 | 19.83 | • | 1.3 | 21.4 |
| 7 | BT INSTL EQ | 1,520.2 | 125.63 | 2.84 | 33.24 | 31.04 | 20.17 | • | 1.5 | 21.8 |
| 8 | SSGA | 1,476.6 | 19.66 | 2.85 | 33.10 | 30.78 | 19.93 | • | 1.5 | 21.4 |
| 9 | Dreyfus S+P | 1,367.7 | 28.70 | 2.72 | 32.63 | 30.41 | 19.58 | • | 1.0 | 21.4 |
| 10 | Federated MAX-CAP INST | 1,216.9 | 20.23 | 2.66 | 32.69 | 30.56 | 19.79 | • | 1.5 | 21.6 |
| 11 | SEI E | 1,106.7 | 30.65 | 2.83 | 33.07 | 30.86 | 19.98 | 17.69 | 1.5 | 21.5 |
| 12 | Schwab INV | 988.4 | 14.93 | 2.74 | 32.47 | • | • | • | 0.9 | • |
| 13 | MNSTY INSTL EQ | 939.0 | 27.05 | 2.76 | 32.88 | 30.64 | 19.74 | • | 1.3 | 21.6 |
| 14 | Dreyfus Basic | 858.9 | 20.57 | 2.82 | 33.02 | 30.73 | • | • | 1.4 | 21.1 |
| 15 | First American C | 855.1 | 19.63 | 2.75 | 32.84 | 30.61 | • | • | 1.1 | 21.4 |
| 16 | Benchmak A | 844.6 | 18.89 | 2.62 | 32.25 | 30.68 | • | • | 1.1 | 21.3 |
| 17 | Nations EQ PRM A | 641.6 | 19.74 | 2.58 | 32.70 | 30.65 | • | • | 1.3 | 21.5 |
| 18 | BT Pyramid INV EQ | 627.8 | 124.95 | 2.79 | 33.02 | 30.86 | 19.94 | • | 1.4 | 21.6 |
| 19 | Pegasus EQ I | 626.2 | 21.37 | 2.84 | 33.00 | 30.83 | 19.95 | • | 1.4 | • |
| 20 | USAA | 595.4 | 15.16 | 2.78 | 33.03 | • | • | • | 1.4 | • |
| 21 | Norwest ADV | 574.5 | 41.03 | 2.77 | 33.18 | 30.34 | • | • | 1.4 | • |
| 22 | Kent FDS INST | 572.9 | 19.14 | 2.78 | 32.55 | 30.17 | 19.52 | • | 1.3 | 21.4 |
| 23 | One Group FID | 570.9 | 23.26 | 2.87 | 32.99 | 30.74 | • | • | 1.4 | • |
| 24 | Galaxy II LgeCo | 536.2 | 28.07 | 2.81 | 32.81 | 30.67 | 19.81 | • | 1.5 | • |
| 25 | Stagecoach CORPST | 510.6 | 61.95 | 2.61 | 31.89 | 29.76 | 19.00 | 16.75 | 0.7 | • |
| 26 | Victory Stock | 493.6 | 18.70 | 2.69 | 32.40 | 30.21 | • | • | 1.5 | 21.4 |
| 27 | Merrill A | 41936 | 12.55 | 2.83 | • | • | • | • | 0.0 | • |
| 28 | Mainstay EQ | 417.2 | 30.91 | 2.69 | 32.36 | 29.94 | 19.17 | • | 0.0 | • |
| 29 | Prudential | 402.5 | 21.87 | • | • | • | • | • | 0.0 | • |
| 30 | DFA GrpUS Lge10 | 343.7 | 28.74 | 2.78 | 33.09 | 30.79 | 19.96 | • | 1.4 | 21.4 |
| 31 | Postico EQ INSTL | 334.2 | 65.80 | 2.81 | 32.59 | 30.64 | 19.70 | • | 1.4 | 21.6 |
| 32 | Harris INS | 294.4 | 23.51 | 2.81 | 32.74 | • | • | • | 1.2 | • |
| 33 | SEI A | 291.6 | 33.59 | 2.76 | 32.82 | • | • | • | 1.3 | • |
| 34 | Munder Y | 280.6 | 20.96 | 2.93 | 32.95 | 30.75 | 19.91 | • | 1.5 | • |
| 35 | Federated MAX-CAP INSV | 265.4 | 20.20 | 2.60 | 32.32 | 30.16 | • | • | 1.2 | 21.6 |
| 36 | Corefund Y | 261.7 | 39.65 | 2.64 | 32.54 | 30.55 | 19.52 | 16.86 | 1.3 | 21.4 |
| 37 | Wachovia EQ Y | 254.2 | 18.74 | 2.76 | 32.70 | • | • | • | 1.6 | • |
| 38 | Dean Witter B | 246.8 | 10.27 | 2.58 | • | • | • | • | 0.0 | • |
| 39 | One Group B | 230.1 | 23.25 | 2.63 | 31.71 | 29.42 | • | • | 0.6 | • |
| 40 | Prudential Z | 211.8 | 21.85 | 2.64 | 32.28 | 30.30 | 19.55 | • | 0.9 | • |
| 41 | Compass SVC | 202.1 | 18.70 | 2.68 | 32.53 | 30.25 | • | • | 1.2 | 21.4 |
| 42 | Pegasus EQ A | 181.8 | 21.36 | 2.73 | 32.68 | 30.69 | 19.88 | • | 1.2 | • |
| 43 | Compass INST | 181.5 | 18.70 | 2.76 | 32.91 | 30.62 | • | • | 1.5 | 21.4 |
| 44 | Schwab CAP E | 151.8 | 14.95 | 2.87 | 32.72 | • | • | • | 0.9 | • |
| 45 | Merrill D | 149.1 | 12.54 | 2.78 | • | • | • | • | 0.0 | • |
| 46 | One Group A | 143.1 | 23.26 | 2.85 | 32.68 | 30.33 | 19.47 | • | 1.2 | • |
| 47 | AON Y | 125.7 | 14.34 | 2.80 | 32.83 | • | • | • | 1.5 | • |
| 48 | Munder A | 124.4 | 20.94 | 2.87 | 32.82 | 30.60 | 19.76 | • | 1.4 | • |
| 49 | Munder K | 122.7 | 20.93 | 2.87 | 32.63 | 30.42 | 19.68 | • | 1.3 | • |
| 50 | Munder B | 83.6 | 20.86 | 2.80 | 32.37 | • | • | • | 1.0 | • |
| 51 | Benchmark C | 83.2 | 18.85 | 2.54 | 33.22 | • | • | • | 1.3 | • |
| 52 | Postico RET | 81.4 | 65.75 | 2.76 | 32.29 | • | • | • | 1.3 | 21.6 |
| 53 | CA INV TR II | 77.0 | 21.13 | 2.90 | 32.99 | 30.80 | 19.93 | • | 1.5 | 21.8 |
| 54 | Northern FDS Stock | 60.9 | 13.24 | 2.77 | 32.68 | • | • | • | 1.0 | • |
| 55 | Wachovia EQ A | 46.0 | 18.74 | 2.64 | 32.32 | 30.36 | • | • | 1.3 | 21.4 |
| 56 | Compass INV B | 42.7 | 18.60 | 2.48 | 31.32 | • | • | • | 0.5 | 21.4 |
| 57 | Keyfunds Stock | 39.4 | 13.34 | 2.77 | 32.44 | • | • | • | 3.0 | • |
| 58 | Mason STK A | 34.7 | 12.70 | 2.57 | • | • | • | • | 0.0 | • |
| 59 | Compass INV A | 30.3 | 18.69 | 2.58 | 32.27 | 30.06 | 19.31 | • | 1.1 | 21.4 |
| 60 | Kent FDS INV | 26.1 | 19.15 | 2.72 | 32.24 | 29.84 | 19.30 | • | 1.1 | 21.4 |
| 61 | First American B | 26.0 | 19.55 | 2.44 | 31.49 | 29.34 | • | • | 0.5 | 21.4 |
| 62 | First American A | 24.7 | 19.64 | 2.63 | 32.51 | 30.28 | 19.65 | • | 1.2 | 21.4 |
| 63 | Transam INV | 23.5 | 15.49 | 2.87 | 33.13 | • | • | • | 2.1 | • |
| 64 | Stron Index 500 | 17.8 | 12.16 | 2.79 | • | • | • | • | 0.0 | • |
| 65 | Arch EQ A | 0.2 | 12.10 | 2.72 | • | • | • | • | 0.0 | • |
| | | | | | | | | | | |
| | Total | $104,711.8 | 30.05 | 2.75 | 28.65 | 20.17 | 9.11 | 1.06 | 1.12 | 10.57 |
| | | Assets ($ Mil) | NAV | QTR | 1YR | 3YRS | 5YRS | 10YRS | DIV YLD | P/E Ratio |
| | | | | | | | | | | |
| | Data Source: Barron's, January 12, 1998 | | | | | | | | | |
| | S&P 500 Index | • | • | 2.72 | 32.60 | • | 19.74 | 17.29 | • | • |
| | Value Line Funds as Percent | 60.52% | | | | | | | | |

Fig. 2

Top Ten Rated Index Mutual Funds

| Fund Name | Total 1997 % Return | Annualized % Returns for 3Years | 5 Years | 10Years | Expense Ratio | Net Assets ($Millions) | Turnover Ratio | Manager Tenure |
|---|---|---|---|---|---|---|---|---|
| Vangurad Index Growth | 36.3 | 32.6 | 19.5 | - | 0.20 | 2,281 | 29 | 6 |
| BT Investment Equity 500 Index | 33.0 | 30.9 | 19.9 | - | 0.25 | 628 | 6 | 6 |
| California Investment S&P Index Ret | 33.0 | 30.8 | 19.9 | - | 0.20 | 77 | 2 | 6 |
| Dreyfus S&P500 Index | 32.6 | 30.4 | 19.6 | - | 0.57 | 1,431 | 5 | 2 |
| Galaxy II Large Company Index Ret | 32.8 | 30.7 | 19.8 | - | 0.40 | 547 | 5 | 3 |
| Schwab 1000 | 31.9 | 29.9 | 19.1 | - | 0.47 | 2,823 | 2 | 4 |
| T. Rowe Price Equity Index | 32.9 | 30.8 | 19.8 | - | 0.40 | 1,834 | 1 | 8 |
| U.S. Global Inv. All America Equity | 30.8 | 27.9 | 16.9 | 11.3 | 0.67 | 26 | 7 | 2 |
| Vanguard Index 500 | 33.2 | 31.0 | 20.1 | 17.8 | 0.20 | 48,265 | 5 | 11 |
| Vanguard Index Value | 29.8 | 29.4 | 20.5 | - | 0.20 | 1,728 | 29 | 6 |
| Averages: | 32.6 | 30.4 | 19.5 | 2.9 | 0.36 | 5,964 | 9.1 | 5.4 |

Source: Data extracted from Ratings table, Consumer Reports, Vol. 63, No. 3 (March 1998), p. 34-35

Fig. 3

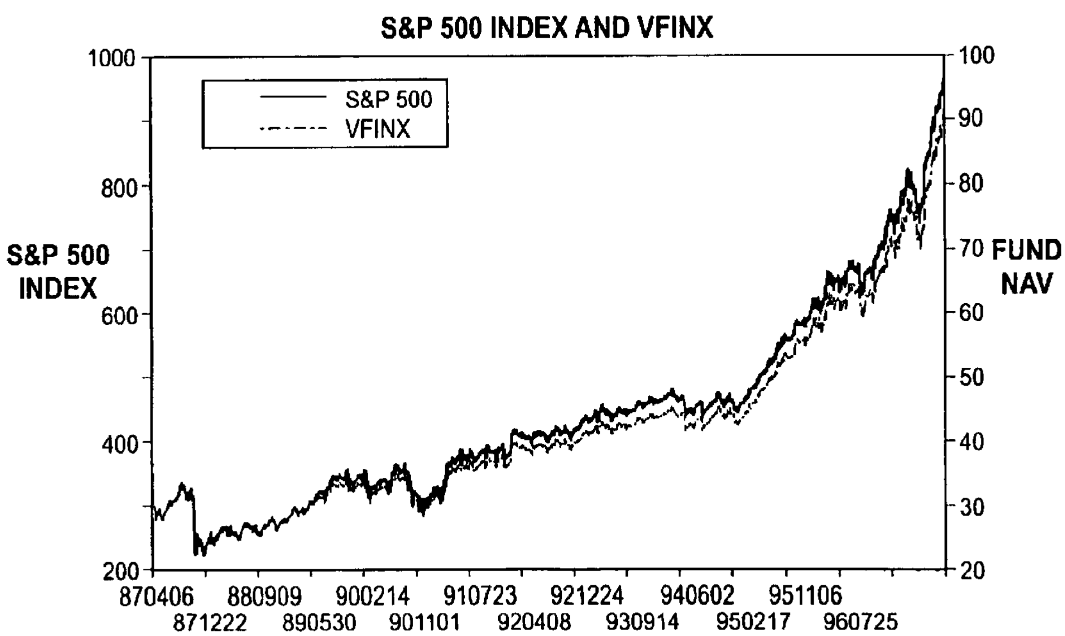

Fig. 4

S&P500 Stock Portfolio

| | Long | | Short | |
|---|---|---|---|---|
| **Tax Rate: 39.60%** | | | | |
| **Capital Gains Rate: 28.00%** | | | | |
| (At t = 0) | | | | |
| Margin for SP500 Contract | $23,338,468.70 | | $23,338,468.70 | |
| Cash Surplus | 23,338,468.70 | | 23,338,468.70 | |
| Total Invested | $46,676,931.40 | | $46,676,931.40 | |
| ***A. Market rises 10% over holding period*** | | | | |
| (At t = 1) | | | | |
| Profit on SP500 Stock Portforlio | ($4,667,700.00) | | ($4,667,700.00) | |
| Tax of Tax Reduction | (1,306,954.08) | | (1,306,954.08) | |
| After-tax Capital Gain or Loss | | ($3,360,736.06) | | ($2,816,286.66) |
| Dividends | 770,168.37 | | (770,168.37) | |
| Tax, or Tax reduction Dividends | 304,987.07 | | (304,987.07) | |
| After-tax Dividends | | 465,182.30 | | (465,182.30) |
| Interest on Money Fund | 1,194,929.44 | | 1,194,929.44 | |
| Tax on Money Fund Interest | 473,192.06 | | 473,192.06 | |
| After-tax Money Fund Return | | 721,737.38 | | 721,737.38 |
| Total net, After-tax return | | $4,547,658.74 | | ($2,562,731.57) |
| Net, After-tax Return on Capital | | 9.74% | | -5.49% |
| Pre-tax Return on Capital | | 11.65% | | -11.65% |
| ***B. Market Falls 10% over holding period*** | | | | |
| (At t = 1) | | | | |
| Profit on SP500 Stock Portforlio | ($4,667,700.00) | | ($4,667,700.00) | |
| Tax of Tax Reduction | (1,306,954.08) | | (1,306,954.08) | |
| After-tax Capital Gain or Loss | | ($3,360,736.06) | | ($2,816,286.66) |
| Dividends | 770,168.37 | | (770,168.37) | |
| Tax, or Tax reduction Dividends | 304,987.07 | | (304,987.07) | |
| After-tax Dividends | | 465,182.30 | | (465,182.30) |
| Interest on Money Fund | 1,194,929.44 | | 1,194,929.44 | |
| Tax on Money Fund Interest | 473,192.06 | | 473,192.06 | |
| After-tax Money Fund Return | | 721,737.38 | | 721,737.38 |
| Total net, After-tax return | | ($2,173,819.38) | | $3,075,841.74 |

Fig. 5

Table 4: Synthetic S&P500 Stock Portfolio

| | |
|---|---|
| **S&P500 Futures Margin** | **$21,000** |
| **Tax Rate:** | **39.40%** |
| **Capital Gains Rate:** | **28.00%** |
| **#S&P Contracts** | **100** |
| **S&P Index Value** | **933.54** |

| | Long | | Short | |
|---|---|---|---|---|
| (At t = 0) | | | | |
| Margin for SP500 Contract | $2,100,000.00 | | $2,100,000.00 | |
| Cash Surplus | 289,858.89 | | 289,858.89 | |
| Treasury Bills | $44,287,072.51 | | $44,287,072.51 | |
| Total Invested | $46,676,931.40 | | $46,676,931.40 | |
| ***A. Market rises 10% over holding period*** | | | | |
| (At t = 1) | | | | |
| Profit on SP500 Stock Portforlio | $4,667,700.00 | | ($4,667,700.00) | |
| Tax of Tax Reduction | (1,519,803.12) | | (1,519,803.12) | |
| After-tax Capital Gain or Loss | | $3,147,896.88 | | $3,147,896.88 |
| Interest on T-bills | 2,342,786.14 | | 2,342,786.14 | |
| Interest on Money Fund | 14.840.78 | | 14.840.78 | |
| Total Interest | 2,359,626.91 | | 2,359,626.91 | |
| Tax, or tax reduction | (928,905) | | (928,905) | |
| After-tax interest | | 1,428,721.91 | | 1,428,721.91 |
| Total net, after-tax return | | $4,576,628.79 | | ($1,719,174.97) |
| Net, After-tax Return on Capital | | 10.33% | | -3.88% |
| Pre-tax Return on Capital | | 15.02% | | -4.98% |
| ***B. Market Falls 10% over holding period*** | | | | |
| (At t = 1) | | | | |
| Profit on SP500 Stock Portforlio | ($4,667,700.00) | | ($4,667,700.00) | |
| Tax of Tax Reduction | 1,519,803.12 | | (1,519,803.12) | |
| After-tax Capital Gain or Loss | | $3,147,896.88 | | $3,147,896.88 |
| Interest on T-bills | 2,342,786.14 | | 2,342,786.14 | |
| Interest on Money Fund | 14.840.78 | | 14.840.78 | |
| Total Interest | 2,359,626.91 | | 2,359,626.91 | |
| Tax, or tax reduction | (928,905) | | (928,905) | |
| After-tax interest | | 1,428,721.91 | | 1,428,721.91 |
| Total net, after-tax return | | ($1,719,174.97) | | $4,576,628.79 |
| Net, After-tax Return on Capital | | -3.88% | | 10.33% |
| Pre-tax Return on Capital | | -4.98% | | 15.02% |

| | |
|---|---|
| **T-Bill Yield** | 5.29% |
| **T-Bill Discount** | 5.15% |
| **Merrill Ready Assets Yield** | 5.12% |

DIGITAL COMPUTER SYSTEM AND METHODS FOR A SYNTHETIC INVESTMENT AND RISK MANAGEMENT FUND

I. FIELD OF THE INVENTION

The present invention pertains to an electrical digital computer machine and a data processing system, methods involving the same and products produced thereby, as well as data structures and articles of manufacture pertaining thereto, pertaining to computerized aspects of financial fields of operating and managing a synthetic investment and risk management fund, creating and servicing interests in the synthetic investment and risk management fund, securities exchanges, exchange trading and financial markets. More particularly, this invention relates to a digital electrical data processing system for a process for operating and managing a synthetic investment and risk management fund, including the creation and servicing of one or more classes of interests in the synthetic investment and risk management fund.

II. BACKGROUND OF THE INVENTION

The market for synthetic investment and risk management products (financial derivatives) has grown in less than three decades from zero to notional values that sometimes exceed the value of the underlying assets. The size of the worldwide swaps market alone is estimated to exceed $40 trillion today.

The growth in the market for synthetic investment and risk management products has occurred because very large financial institutions and corporations have been able to use synthetic products to produce superior investment and risk management performance relative to the underlying assets. However, effective use of synthetic investment and risk management products has been largely restricted to very large financial institutions and corporations because of the large contract sizes typical of synthetic products and the degree of sophistication required for their effective use.

Opening the market for synthetic investment and risk management products to a broader market of medium and smaller-sized investors and businesses requires the creation of efficient, computer-managed funds for investment and risk management products. There have been a very few articles in professional journals (Herbst, Anthony F., and N. Ordway, "Stock Index Futures and the Separability of Returns," *The Journal of Futures Markets*, Vol. 4, No. 1, Spring 1984, pp. 87–102; Hill, Joanne, and Humza Naviwala, "and Enhanced Index Strategies Using Futures on U.S. Indexes," *Journal of Portfolio Management, 25th* Anniversary Issue, 1999, pp. 61–74; Miller, Todd, and Timothy Meckel, "Index Funds with Derivatives," *Journal of Portfolio Management, 25th* Anniversary Issue, 1999, pp. 75–87) that have addressed the creation of superior investment performance using synthetic products, but none have considered the issues involved in creating efficient, computer-managed funds for synthetic investment and risk management products that will make these products available to a broader market.

The benchmark for investment performance is market investment performance, measured by an index of market performance such as the S&P 500, the Russell 2000 or the Wilshire 5000.

Stock index funds were developed in order to offer investors the choice of matching market performance as closely as possible. However, even the most efficient stock index funds face transactions costs, management costs and tracking errors that prevent them from actually delivering performance that matches their chosen market index.

Present stock index funds suffer from significant transactions costs because of their need to constantly adjust their holdings of a large number of stocks in order to maintain a portfolio that accurately reflects the performance of the stock index that the fund managers are attempting replicate with their investment fund. In an attempt to reduce these costs, fund managers have developed "tracking portfolios" that contain fewer stocks than the index but have, in the past, tracked the performance of the desired index within certain margins.

The use of tracking portfolios reduces the number of stocks that must be traded, thus reducing transactions costs. However, differences between the tracking portfolio and the specified index may cause the performance of the index fund to deviate somewhat from the index that the fund is seeking to track and the past performance of tracking portfolio relative to the index does not guarantee its future performance. Also, the tracking portfolios still contain large numbers of stocks (although significantly less than the number of stocks in the index) and, as a result, transactions costs remain significant.

The transactions costs significantly increase when a stock index fund is attempting to track an international index or indexes. Foreign stock markets are less liquid and have higher transaction costs relative to U.S. markets. In addition, many foreign governments add significantly to the costs of index funds holding their stocks by imposing transfer taxes and/or dividend withholding taxes on foreign holders of their equities. This is a growing problem for stock index funds as more and more investors realize that global market performance is the true investment benchmark in our global economy.

Stock index funds face a significant management, cost and risk problem when, as often occurs, a stock is removed from the market index being tracked and is replaced by a new stock. In order to track the index, stock index fund managers must all sell the stock leaving the index and buy the stock entering the index at approximately the time that change in the index occurs. Because traders and other investors know which stock the index fund managers must sell and which they must buy and when, it is difficult for the index fund managers to execute the trades without receiving an abnormally low price for the stock being sold and paying an abnormally high price for the stock being purchased, thus negatively impacting their investment performance.

Another problem with present index funds, for taxable investors, is the creation of unrealized capital gains that may build up in large amounts before being realized as a result of the transactions required to track the index. Investors in the fund do not know the amount or the timing of the capital gains that may result from the realization of these embedded capital gains as a result of the transactions necessary to track the index. Changes in the makeup of the index (e.g., as a result of merger activity) and/or changes in relative prices of stocks within the index may trigger the realization of large amounts of embedded gains.

In addition to making tax planning difficult for taxable investors, the realization of these embedded gains can create tax liabilities for gains that actually occurred before the investor purchased the fund, thus causing the investor to owe tax on gains that the investor earned. The investor ends up owing tax on "phantom" gains because the investor paid a price for the shares of the fund that included the embedded gains that were realized and, therefore, now owes taxes on gains that the investor never received.

The emergence of deep, liquid markets for futures and options on popular stock indexes has made it possible to use synthetic investment products to overcome the problems of high transactions costs (especially for foreign equities), the imperfections of tracking portfolios, the uncertain timing of taxable capital gains and the problem "phantom" capital gains and create enhancements that can enable investors to actually outperform market indexes on a regular basis. One of the inventors of the present invention, Anthony F. Herbst, has published academic research (Herbst, Anthony F., and N. Ordway, "Index Futures and the Separability of Returns," *The Journal of Futures Markets*, Vol. 4, No. 1, Spring 1984, pp. 87–102) on the use of stock index futures to obtain superior investment performance. This research (and the other published research on using synthetic products to create superior investment performance) does not consider the creation of synthetic index funds that can bring this superior investment performance to a broad range of investors.

Reduced transactions costs translate into improved investment performance for the investor, especially investors pursuing active trading strategies. Increased accuracy in tracking the market index benefits the investor. Eliminating taxes on "phantom" capital gains benefits investors, especially investors pursuing active trading strategies. Enhancements that create above-market return benefit investors by providing superior investment performance. The creation of a computerized process for managing synthetic investment and risk management funds makes it possible to create synthetic funds that make these benefits available to the broad spectrum of investors rather than just the elite few.

One way to enhance a synthetic index fund in order to produce investment performance superior to the market index is to manage the portfolio of interest-bearing assets so as to produce interest income exceeding the Treasury Bill rate. In market equilibrium, the difference between the price of the index future and the price of the underlying stocks is a function of the difference between the interest income on an amount of Treasury Bills equal to the amount of the underlying stocks and the dividend income on the underlying stocks. Since only a small amount of the interest-bearing assets must be held in Treasury Bills, it is possible to earn enough extra interest income to enable the synthetic fund to outperform the market index.

In addition to improved investment performance relative to present index funds and even the market index itself, a computer-managed synthetic index fund can offer investors options that are not available with present stock index funds. The options which might be offered to an investor, all of which could be efficiently offered by a single synthetic fund, include: 1) the choice of multiple kinds of interests involving different derivative instruments and/or different interest-bearing assets, including foreign derivatives and/or interest bearing assets; 2) the choice of different classes of interests offering varying degrees of leverage for the derivative instruments; 3) the option of different classes of interests that include short as well as long derivative positions; 4) the ability to trade interests quickly and at low cost throughout the trading day; 5) the option to switch among various classes of interests quickly and at a low cost; 6) the option of the investor custom creating his or her own class of interest and varying the nature of this custom interest over time; and, 7) the option to invest in one or more classes of interests managed by professional managers.

Many of the benefits that can be created by computer-managed synthetic index funds are of special value to investors (and investment managers) whose investment strategy requires active trading. Active trading magnifies the transactions cost advantages of a computer-managed synthetic index fund and the tax treatment of futures and options (all gains are taxed 60% long-term and 40% short-term) can create significant tax savings for active traders. In addition, computer-managed synthetic index funds can offer investors limit orders and the ability to trade at any time during the day—neither of which are possible when investors trade shares in conventional stock index funds.

Synthetic products are also widely used by large financial institutions and businesses to manage risk—especially interest rate risk and currency risk. The computer process that is the subject of this invention can also be used to manage synthetic risk management funds that will broaden the market for managing interest rate and currency risk to include smaller and medium-sized businesses and institutions.

III. SUMMARY OF THE INVENTION

In view of the foregoing, it is an object of the present invention to provide a computer-aided method for operating at least one synthetic investment fund.

It is a further object of the present invention to provide a computer system for operating and managing such an investment fund.

It is another object of the present invention to provide such a computer system for trading, matching, bidding or hedging in connection with such an investment fund.

It is still another object of the present invention to provide such a computer system for credit (risk) processing and credit transactions for such an investment fund.

It is yet another object of the present invention to provide such a computer system for associated document generating in connection with such an investment fund.

It is yet still another object of the present invention to provide such a computer system for handling point of sale terminal activity in connection with such an investment fund.

It is an additional an object of the present invention to provide such a computer system for price determination in connection with such an investment fund.

It is still an additional object of the present invention to provide such a computer system for interconnecting terminals in connection with such an investment fund.

It is yet an additional object of the present invention to provide such a computer system for inventory monitoring in connection with such an investment fund.

It is also object of the present invention to provide such a computer system for having security or user identification provision (password entry, etc.) in connection with such an investment fund.

It is yet also an object of the present invention to provide such a computer system for electronic shopping in connection with such an investment fund.

It is nonetheless also an object of the present invention to provide such a computer system for inventory management in connection with such an investment fund.

It is a however also an object of the present invention to provide such a computer system for accounting, such as bill or statement preparation, in connection with such an investment fund.

It is a nevertheless also an object of the present invention to provide such a multiple computer system cooperating to carry out in connection with such an investment fund.

The inventors herein have sought to attain these and other objects evident herein as making matters better by providing a modern automated data processing system to manage synthetic investment funds that can broaden the market for synthetic investment and risk management products to include medium sized and smaller investors, businesses and financial institutions. As compared to present stock index funds these computer managed synthetic investment funds can: 1) reduce the transactions expenses required to operate the fund; 2) improve the tracking of the specified index; 3) provide superior investment performance; 4) enable investors to quickly and at a low cost trade interests in the fund throughout the trading day; and, 5) virtually eliminate the embedded capital gains that can create problems of tax timing and "phantom" taxable gains for taxable investors.

The inventors have developed a further improvement in the accuracy with which the synthetic index fund can track the specified index. This is accomplished by periodically adjusting the holdings of different maturities of the stock-related instrument so as to maintain a constant weighted-average maturity for the stock-related instrument. Maintaining a constant weighted-average maturity reduces the basis risk of the stock-related instrument, thus further increasing the accuracy with which the fund tracks the specified index.

In addition to the above improvements in performance relative to present stock index funds, the synthetic investment fund can be modified to offer investors options that are not available with present index funds. The options which might be offered to an investor, all of which could be efficiently offered by a single fund, include: 1) the choice of multiple kinds of interests involving different derivative instruments and/or different interest-bearing assets, including foreign derivatives and/or interest bearing assets; 2) the choice of different classes of interests offering varying degrees of leverage for the derivative instruments; 3) the option of different classes of interests that include short as well as long derivative positions; 4) the ability to trade interests quickly and at low cost throughout the trading day; 5) the option to switch among various classes of interests quickly and at a low cost; 6) the option of the investor custom creating his or her own class of interest and varying the nature of this custom interest over time; and, 7) the option to invest in one or more classes of interests managed by professional managers.

With regard to the expanded options made possible by the present invention, the inventors mean to define the term derivative instrument broadly to include any instrument whose price depends on the price of another asset including, but not limited to, all commodity futures and options as well as all financial futures, options and swaps.

When the present invention is applied to these expanded options, the fund created by the invention may be something other than a synthetic investment fund. For example, when applied to commodities and/or interest rate futures, the invention may be used to create a hedging fund that offers increased flexibility and reduced basis risk to hedgers seeking to manage their risks. The increased flexibility results from the ability to invest in fractional contracts. The reduced basis risk results from the ability of the fund to maintain a constant weighted average maturity for the futures.

The synthetic investment fund may be structured, depending upon current financial regulations, as a mutual fund, a commodities pool, a limited liability company, a limited partnership, a trust fund or any other structure that is consistent with the operation of the fund.

Generally, to meet these and the other objects of the present invention apparent from improving over the prior state of affairs, we have invented a computer system and methods for managing a synthetic investment fund. The data processing system includes a programmed electrical digital computer having a processor electrically connected to an input device and to an output device. The data processing system manages a synthetic investment fund by entering, as some of the input information, at least one of the group consisting of an amount of an interest-bearing asset, and an amount of a derivative instrument, and entering a specification of a relationship for the amounts; entering, as some of the input information, respective market prices for the interest-bearing asset and for the derivative instrument; calculating a unit value for each said class of interests in the fund in response to the market prices; and generating output for investor reporting, the output including holding data for each said class of interests in the fund and the unit value for each said class of interests in the fund.

For further perspective, consider the following which are incorporated by reference. "Books and Bytes: A New Primer on Index Funds," *Mutual Funds*, July 1997, p. 67; "Funds and Gains," *Consumer Reports*, Vol. 63, No. 3 (March 1998), pp. 30–36; Damato, Karen, "S&P 500 Still Beats Most Managers," *The Wall Street Journal*, Jul. 3, 1997, R1; Dorfman, John R., "Intel Fires Active Money Managers in Switch to Indexing," *The Wall Street Journal*, Aug. 25, 1995, C1; Herbst, Anthony F., and N. Ordway, "Stock Index Futures and the Separability of Returns," *The Journal of Futures Markets*, Vol. 4, No. 1 (Spring 1984), pp. 87–102; Ip, Greg, "Why Index Funds Aren't as All-Powerful as Some Think," *The Wall Street Journal*, Mar. 11, 1998, p. C1; Koski, Jennifer Lynch, and Jeffrey Pontiff, "How Are Derivatives Used? Evidence from the Mutual Fund Industry," Working Paper, University of Washington, January, 1996 version; Lowenstein, Roger, "Indexing's Real Uncertainty Principle," *The Wall Street Journal*, Jan. 30, 1997, C1; Lucchetti, Aaron, "New Tax Law is Expected to Boost Options by Mutual-Fund Managers," *The Wall Street Journal*, Aug. 11, 1997, C15; Lucchetti, Aaron, "Tax Change Prompts Funds to Buy Riskier Commodities," The Wall Street Journal Interactive Edition, Oct. 23, 1997; McGee, Suzanne, "Got a Bundle to Invest? Think Stock-Index Futures," *The Wall Street Journal*, Feb. 21, 1995, C1; O'Neal, Edward S., "How Many Mutual Funds Constitute a Diversified Mutual Fund Portfolio?" *Financial Analysts Journal*, Vol. 53, No. 2 (March/April 1997), pp. 37–46; Siconolfi, Michael, and Robert McGough, "Equalling S&P Results Can Be More Difficult Than It Appears," *The Wall Street Journal Interactive Edition*, Jan. 28, 1997; and Waggoner, John, "Vanguard Yellow Flags Index Funds," *USA Today*, Feb. 19, 1997, 3B.

IV. BRIEF DESCRIPTION OF THE DRAWINGS

FIG. 1 presents the performance of funds to 1998;

FIG. 2 contains data on the 10 top-rated index funds;

FIG. 3 graphs the S&P 500 index with the net asset value of the Vanguard Index 500 fund;

FIG. 4 illustrates results under assumptions of earnings that might be expected from an S&P 500 stock portfolio given a 10 percent move in the index in either direction;

FIG. 5 provides results of a synthetic S&P 500 index portfolio;

Figure 7:
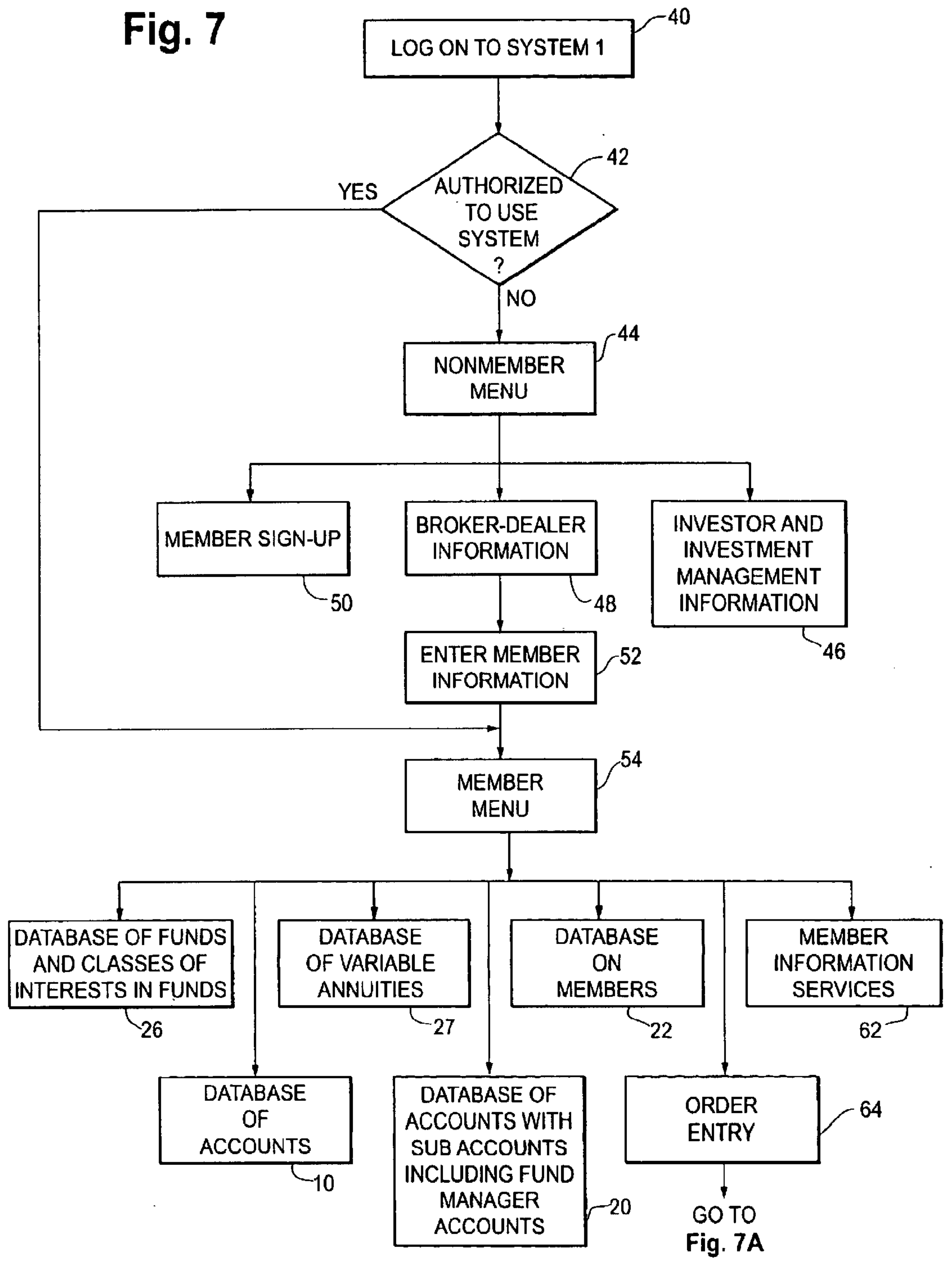
FIG. 7 is an illustration of a flow chart for an embodiment of the present invention.
Figure 7A:
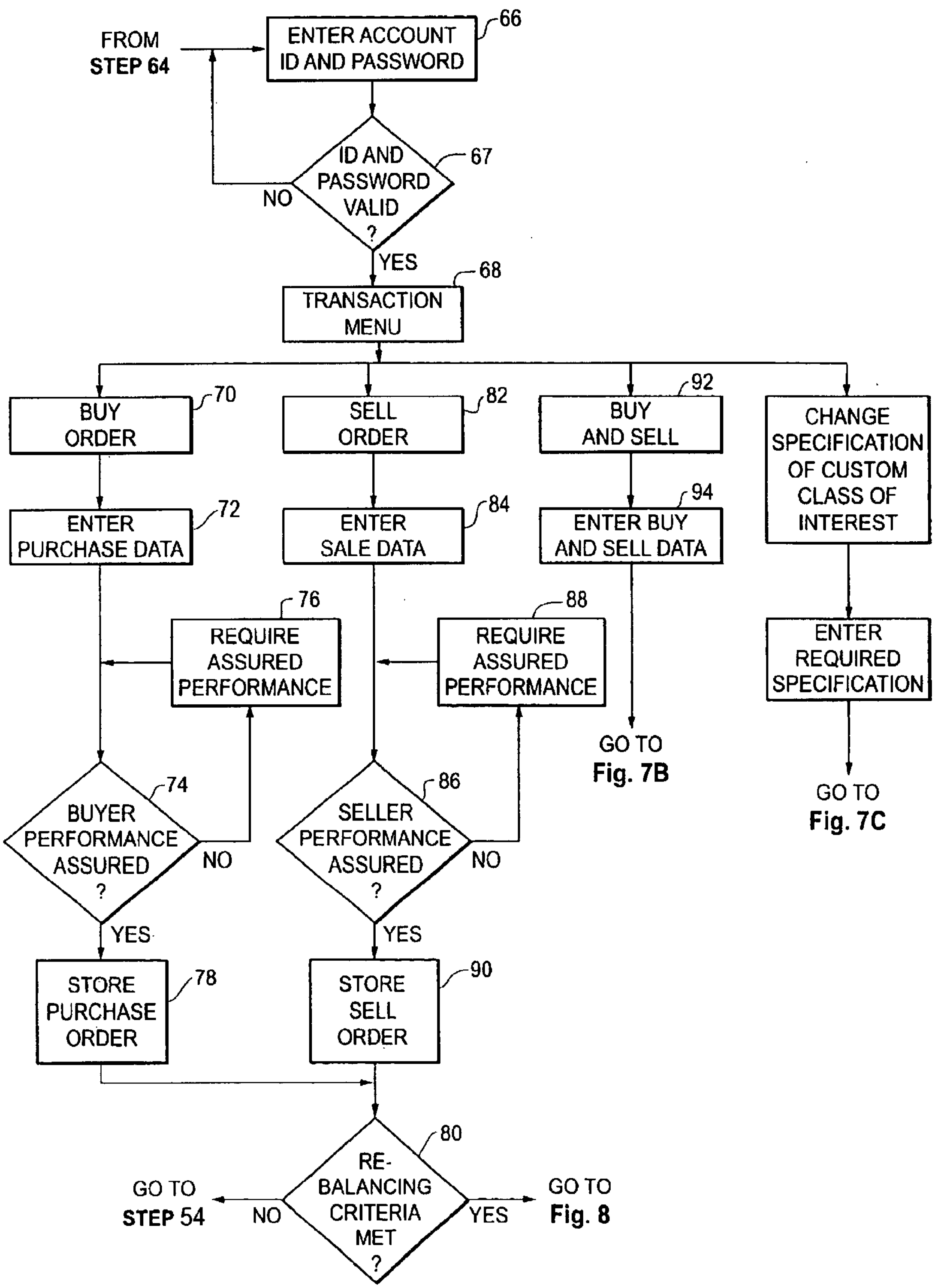
Figure 7B:
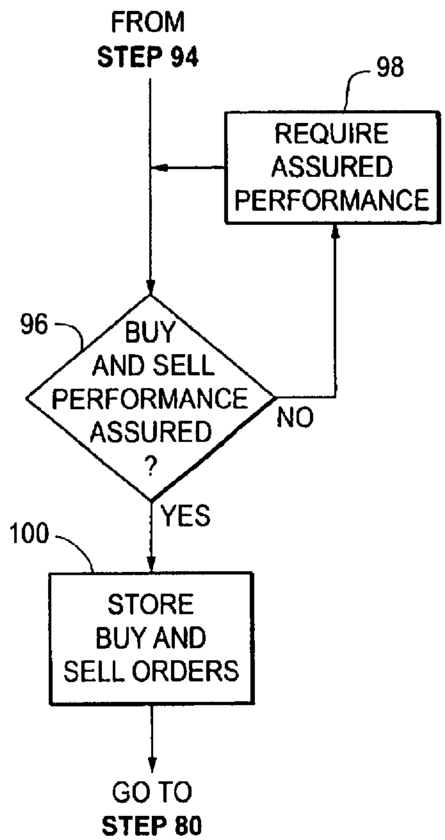
Figure 7C:
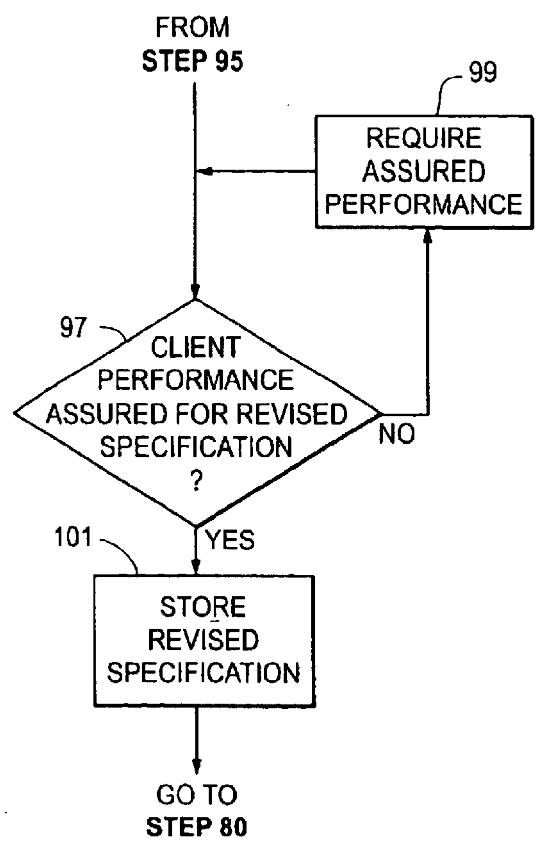
Figure 8:
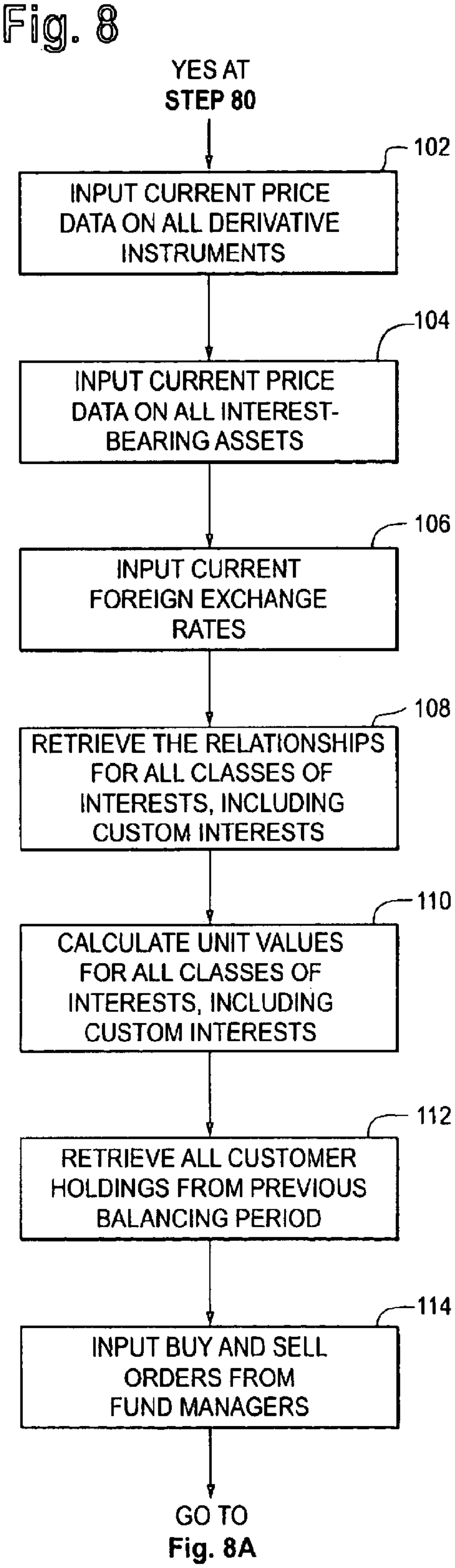
Figure 8A:
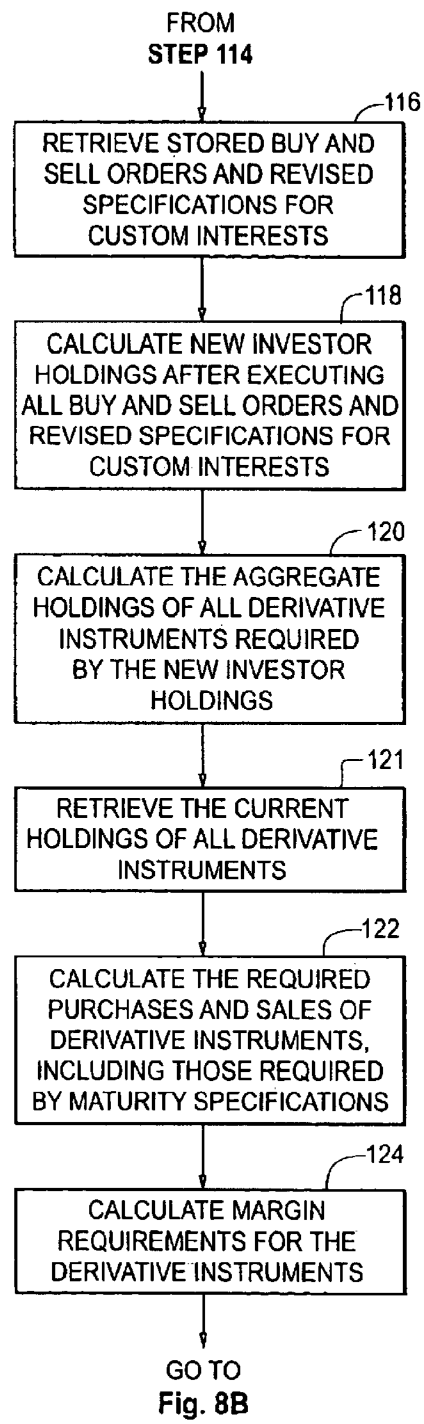
Figure 8B:
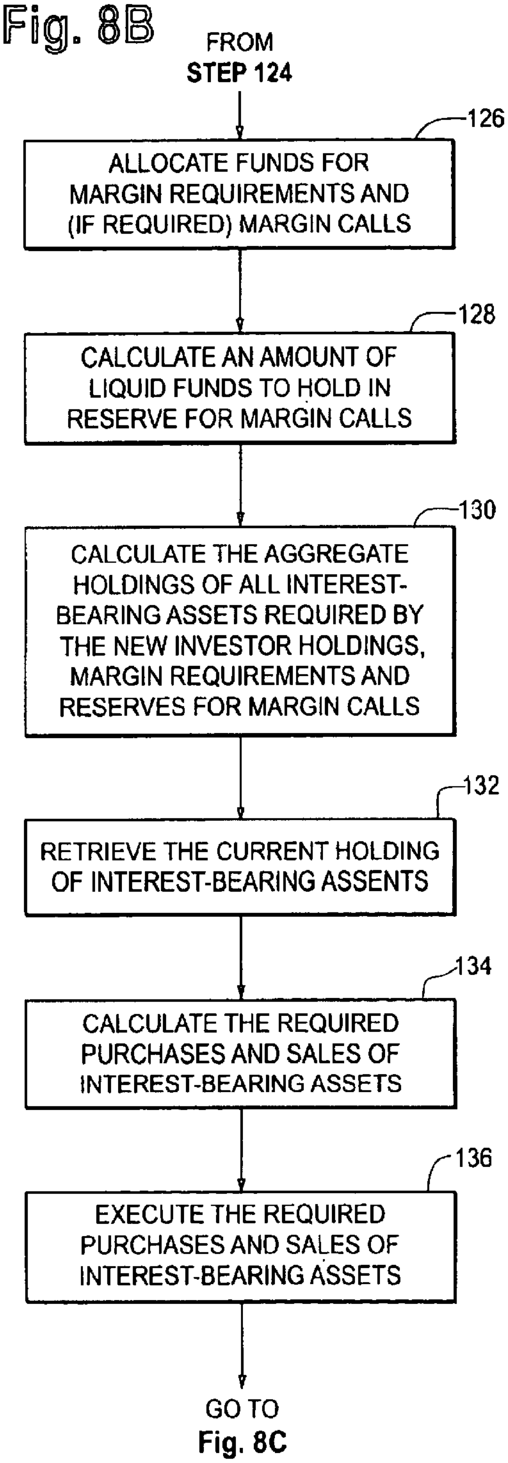
Figure 8C:
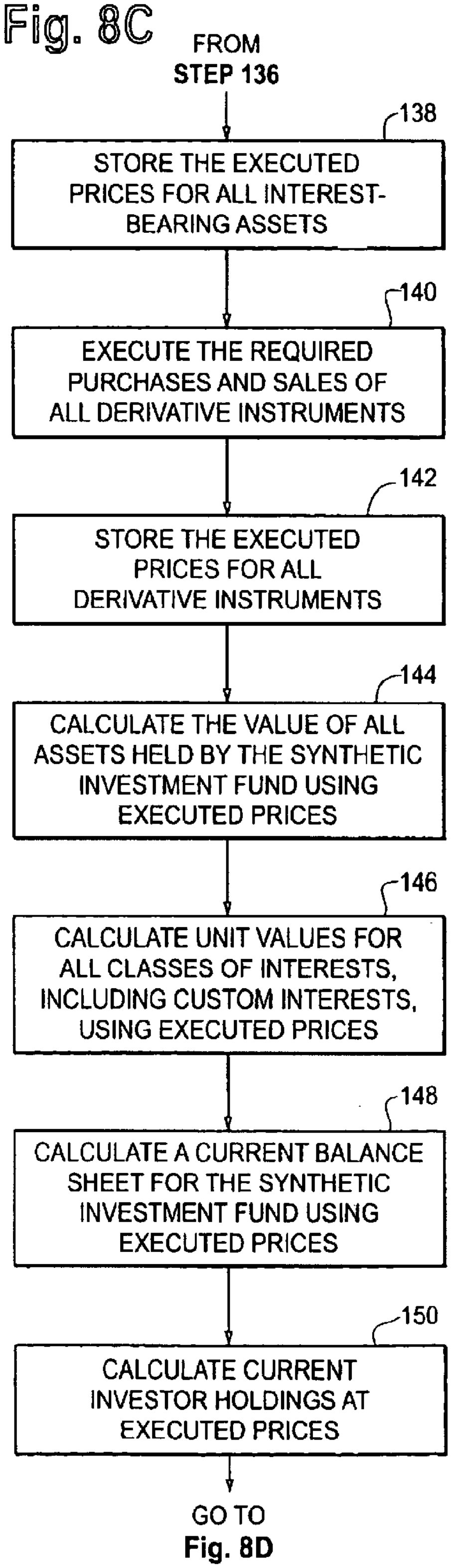
Figure 8D:
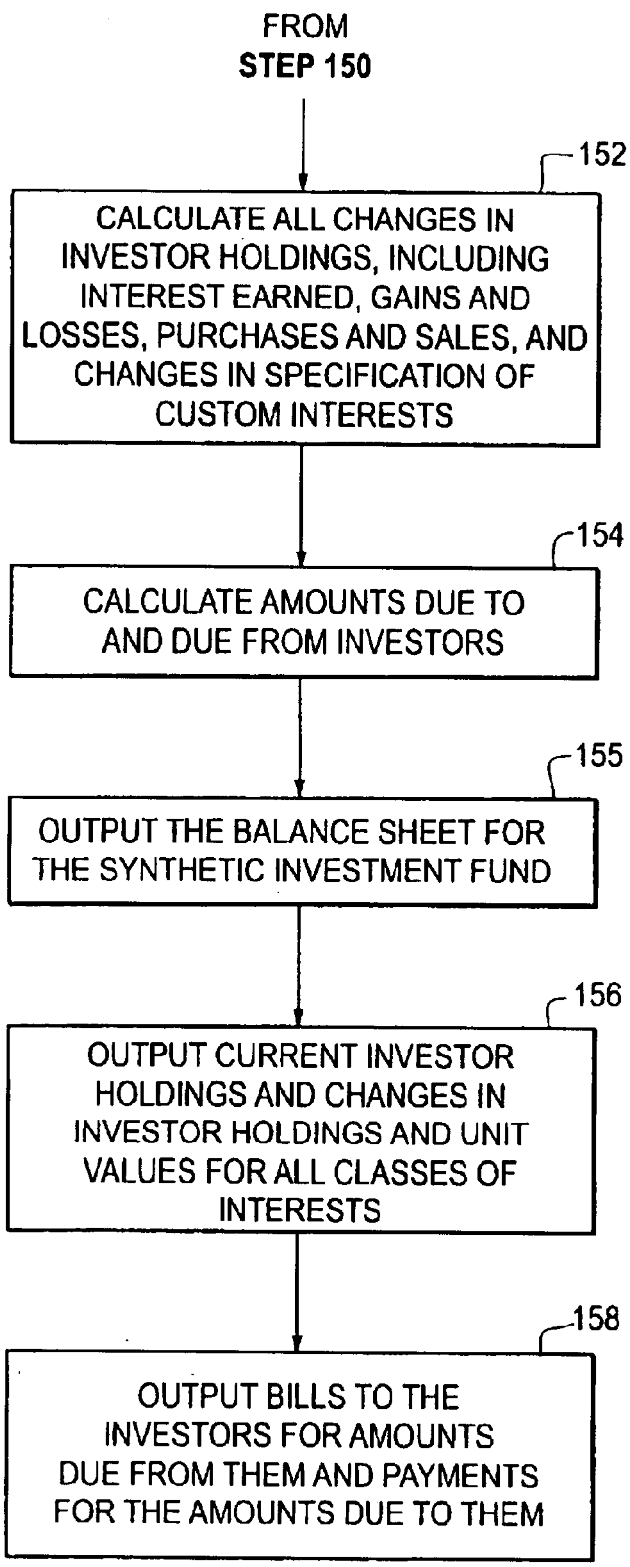

FIG. 7-A is an illustration of a flow chart for an embodiment of the present invention;

FIG. 7-B is an illustration of a flow chart for an embodiment of the present invention;

FIG. 7-C is an illustration of a flow chart for an embodiment of the present invention;

FIG. 8 is an illustration of a flow chart for an embodiment of the present invention;

FIG. 8-A is an illustration of a flow chart for an embodiment of the present invention;

FIG. 8-B is an illustration of a flow chart for an embodiment of the present invention;

FIG. 8-C is an illustration of a flow chart for an embodiment of the present invention;

FIG. 8-D is an illustration of a flow chart for an embodiment of the present invention.

V. DETAILED DESCRIPTION OF A PREFERRED EMBODIMENT

To provide an understanding of the present invention, consider the properties and performance of stock index funds, which account for over $100 billion in net stock market investment value. If an index fund is to track the a target stock market index, then the most efficient, and cost effective means for doing so should be used. In accordance with the present invention, consider emulating the S&P 500 using U.S. Treasury securities with S&P 500 index futures contracts in comparison with index fund returns.

The central theme of stock index funds is that they provide a way for investors, especially smaller investors, to invest in a broad-based market index. The index used most is the S&P 500, which contains high capitalization companies, representing all major U.S. industrial segments. These funds purport to track their target indexes, neither doing markedly better nor worse than the corresponding index.

In July, 1997, Barron's Mutual Fund Supplement listed 21 index funds, belonging to 12 fund families. The Vanguard Index 500 Portfolio and Vanguard Institutional Index Fund together accounted for over $64 billion of a total for all 21 funds of $71.8 billion, or 75.4 percent of the total.

By January, 1998, Barron's listed more than 60 index funds. The Vanguard Index 500 Portfolio and Vanguard Institutional Index Fund together accounted for $63.4 billion, virtually unchanged from mid-1997, but slipping to 60.5 percent of the total index fund assets of $104,712 billion. Overall, the growth in assets of all such index funds over the period measures 45.8 percent. FIG. 1 presents the performance of these funds to 1998.

In terms of longevity Vanguard Index 500 Portfolio Fund, Stagecoach Corporation Stock fund, SEI E fund, and Corefund Y, are the only funds that have existed for 10 or more years. It is interesting that the Stagecoach's and Corefund's ten-year returns are almost a full percent less than Vanguard's and with lower dividend yields. This should not be expected in index funds that truly emulate the same index, unless there are significant differences in management fees, brokerage costs, or other important factors.

FIG. 2 contains data on the 10 top-rated index funds (out of 89 such funds) that met the Consumer Reports criteria for inclusion in its March, 1998 list. The 79 others were excluded because they have high expense ratios, loads, or 12b-1 fees, and thus excessive costs for funds purporting to mirror a market index. "How to Choose Mutual Funds," *Consumer Reports*, Vol. 63, NO. 3(March 1998): 30–36. Despite their higher costs, their performances were not significantly better than the ten selected (as we would expect of index funds), so their inclusion would contribute little to the analysis or discussion here.

It is noteworthy that the turnover ratios in FIG. 2 range from 1 to 29, which is a wide variation. One might ask why, considering the objective is to track a market index, two of the funds, including the largest, have such a high turnover. Also, though the funds included in FIG. 2 did not have "excessive fees" the fee range among these top ten rated funds is from 0.20 to 0.67. The fund with 0.67 has only $26 million under management, so this is understandable, but the next highest, at 0.57, has $1,431 million under management and thus its expense ratio seems questionably high compared to the others.

As FIGS. 1 and 2 illustrate, index funds generally earn returns that are very similar to one another. On average they earn returns that are very close to the cash index they target. FIG. 3 graphs the S&P 500 index with the net asset value of the Vanguard Index 500 fund. The closeness of fit is very tight, as would be expected, with the slight divergence over time, which is explainable as withdrawals by investors, and reflecting transaction and administrative costs. One might ask whether the funds, or other investors, can earn a superior return to the cash index while tracking its overall performance closely. Doing so might be possible if a low margin deposit can be used to buy the index while earning a risk-free or low risk return on the funds available for investment.

Changes in U.S. federal tax law effective in early August, 1997 allow mutual funds to use futures contracts more effectively than before. Now mutual funds may invest in short-term derivatives, such as futures contracts and options, without jeopardizing their "flow through" status that taxes investment profits at shareholder level instead of fund level. Prior to the revision in tax law the "short—short" rule meant funds were taxed an additional 35 percent corporate rate when they derived over 30 percent of their income from investments held less than 90 days. With freedom to use futures and options it will be possible to track popular stock market indexes more effectively and cheaply than before, though in principle a fund with long-term perspective could have used them before the change in tax law. Lucchetti, Aaron, "Tax Change Prompts Funds to Buy Riskier Commodities," *The Wall Street Journal Interactive Edition*, Oct. 23, 1997. "Futures on financial instruments such as Treasuries and stock index futures have been interpreted as good income . . . " which is not subject to the punitive tax on funds that derive more than 10 percent of their income from 'bad income areas' such as commodity futures.

With the exception of a paper by Herbst and Ordway (1984) the academic literature has been largely silent on the substitution of an index future plus Treasury bill synthetic portfolio for a stock portfolio. Herbst and Ordway did not consider index funds, since at the time they were not a factor in the mutual fund industry. Now specifically consider how a synthetic portfolio based on an index future with Treasury bills might substitute for an index mutual fund, given the current market and regulatory environment.

Assumptions

Assume the following in order to perform a systematic analysis and comparison of index fund alternatives:

Mutual funds pay no taxes but taxes are paid by the shareholders at their own rates, and our calculations will reflect this;

Mutual funds invest via cash accounts, though they can use margin accounts if they choose;

Index funds are always net long the index they track;

T-Bill 90-day yield of 5.29 percent (5.15 percent discount);

Merrill Ready Assets yield of 5.12 percent as a surrogate for non-Treasury short-term yield;

Tax rate on ordinary income of 39.6 percent;

Tax rate on long-term capital gains of 28 percent;

Blended tax rate on futures of 32.64 percent (60 percent long-term, 40 percent short-term);

S&P500 futures contract margin of $21,000;

S&P Index value of 950;

T-Bills or other short-term to maturity Treasury securities may be used as margin for positions in index futures contracts;

The mandate of the fund management is to track the target index, not outperform it;

For illustration, capital of $100 million is assumed available;

If index futures are used to track the index, the underlying stock investment is the same as with cash or margin purchase of the index's stock—Using Barron's Jan. 26, 1998 values of Market/Book=526.61%, and $Book=$182 we calculate S&P500 Mkt/Book*Book value*100 Shares*500=$47,957,381=Amount in Cash Portfolio. The number of S&P 500 Index futures contracts is determined from the Amount in Cash Portfolio/(500*S&P500 Index Value) rounded to the nearest whole contract;

The dividend rate on the S&P 500 index is 1.65 percent per annum.

FIG. 4 illustrates the results under these assumptions of the earnings that might be expected from an S&P 500 stock portfolio given a 10 percent move in the index in either direction. Both long and short position results are shown. However, this is only for the sake of completeness, simulating what an individual investor might do, and not because any index fund engages in short selling. It is assumed that long positions are held long enough for capital gains. For a rising market the returns to long and short positions are +11.65 percent and −11.65 percent. For a falling market the returns to long and short positions are −4.66 and +6.59 percent. The asymmetry is introduced by the different tax treatment accorded long and short positions.

Treasury bills and depositing them as initial margin for purchase of a number of S&P 500 Index Futures equivalent in value to the cash portfolio illustrated in Table 3. For a rising market the returns to long and short positions are +15.02 percent and 4.98 percent. In a falling market these results are reversed to 4.98 percent and +15.02 percent. This is due to the symmetry in tax applied to futures profits and losses, irrespective of holding period.

Comparison of results demonstrates that synthetic portfolios can offer superior returns to cash portfolios, whether long or short, in a rising or a falling market. The implication is clear: individual investors can readily construct a synthetic portfolio that offers superior results over a stock portfolio if they wish to emulate the overall market. And index funds can reduce commission costs and obtain superior results by means of synthetic portfolios, as long as market liquidity can accommodate their activities. Until enough funds attempt to adopt this strategy liquidity should not be a problem.

If the function of an index fund is truly to emulate a market index, then it makes sense for the most efficient, responsive, and cost-effective means of achieving that objective to be employed. To actually construct a portfolio of index stocks is a formidable task, involves substantial commissions and slippage in transactions, and thus often means that portfolio management in practice takes short cuts. The short cuts involve building portfolios that are thought to closely track the market index, based on correlation of historical data, or else require larger investment than some funds can afford if index stocks are to be held in proper proportion to their role in the index that is to be tracked. Consequently, it makes sense to employ a simple, efficient, and cost-effective alternative, such as the one discussed in this paper. Doing so may offer some real advantages to investors, if not to the fees and commissions of those in the securities industry.

Accordingly, the inventors herein have provided the present invention to make the benefits of synthetic investment and risk management products available to much broader market. When applied to synthetic index funds, the computerized process for managing synthetic funds facilitates lowering the operating costs of the fund, increasing the return to a rate exceeding the return on the underlying index, improving the accuracy of tracking the desired index, improving tax planning and virtually eliminating the problem of "phantom" gains for taxable investors, and increasing the current income yield.

In addition, the preferred embodiment described herein offers investors options that are not available from present index funds. The options offered by this preferred embodiment include:

1) the choice of multiple classes of interests involving different derivative instruments and/or different interest-bearing assets, including foreign derivative instruments and/or interest bearing assets; 2) the choice of different classes of interests offering varying degrees of leverage for the derivative instrument; 3) the option of different classes of interests that include the option of going short the derivative instrument; 4) the ability to trade interests quickly and at low cost throughout the trading day; 5) the option to switch among various classes of interests quickly and at a low cost; 6) the option of the investor custom creating his or her own class of interest and varying the nature of this custom interest over time; and, 7) the option to invest in one or more classes of interests managed by professional managers.

When applied to synthetic risk management funds, the computerized process facilitates lowering the cost of hedging interest rate risk and currency. It also facilitates hedging using partial contracts and for time periods that are not consistent with the expiration date of contracts, thus broadening the market for hedging interest rate risk and currency risk. The computerized system also enables these risk management tools to be utilized within a synthetic index fund. Utilizing derivatives to manage interest rate risk and currency risk can improve the performance of a synthetic index fund and reduce its risk.

Accordingly, the present invention extends to an electrical digital computer machine and a data processing system, methods involving the same and products produced thereby, as well as data structures and articles of manufacture pertaining thereto, summarized for the sake of brevity as a method of using an apparatus, etc. The method is a computer-aided method for operating a synthetic investment fund, the method including the steps of: providing a digital electrical computer apparatus including a digital computer having a processor, the processor electrically connected to a memory device for storing and retrieving machine-readable signals, to an input device for converting input information into input electrical data, and to an output device for converting output electrical data into print, the processor programmed to control the apparatus to receive the input data and to produce the output data by steps including: forming a synthetic investment fund by entering, as some of the input information, at least one of the group consisting of an amount of an interest-bearing asset, and an amount of a derivative instrument, and entering a specification of a relationship for the amounts; entering, as some of the input information, respective market prices for the interest-bearing asset and for the derivative instrument; calculating a unit value for each said class of interests in the fund in response to the market prices; and generating output for investor reporting, the output including holding data for each said class of interests in the fund and the unit value for each said class of interests in the fund.

In the foregoing embodiment, method can further include: balancing the amounts according to the relationship; and generating transactions data, reflecting the balancing, for at least one of the interest-bearing asset and for the derivative instrument as some of the output data.

In any of the embodiments, the method can be carried out such that the step of entering respective market prices includes entering a constant maturity specification for the derivative instrument.

In any of the embodiments, the method can be carried out such that the step of entering respective market prices includes entering a maturity specification for the derivative instrument.

In any of the embodiments, the method can be carried further including: inputting, as some of the input information, respective transaction orders for the interests in the fund; inputting, as some of the input information, updated price data for the interest-bearing asset and for the derivative instrument; accounting for the transaction orders in generating revised holding data for each said class of interests in the fund; recalculating the unit value for each said class of interests in the fund; and generating a report including the recalculated holding data and the recalculated unit value respectively for each said class of interests in the fund.

In any of the embodiments, the method can be carried out such that the step of balancing is triggered by at least one member of the group consisting of time, change in time, price of the derivative instrument, a change in the price of the derivative instrument, a transaction order and an amount of transaction orders.

In any of the embodiments, the method can be carried out such that the step of accounting includes the steps of: storing in a database the holding data for each said class of interests in the fund and the unit value for each said class of interests in the fund of respective investors; retrieving some of the holding data from the database prior to the transaction orders for the interests in the fund; adjusting the holding data after carrying out of the transaction orders; storing the holding data reflecting the carried out transaction orders in the database; and generating, as part of the output data, the holding data reflecting the carried out transaction orders.

In any of the embodiments, the method can be carried out such that the step of balancing includes changing the amount representing a non-United States debt instrument as the amount of the interest-bearing asset.

In any of the embodiments, the method can be carried out such that the step of balancing includes balancing the amount of a government debt instrument as the amount of the interest-bearing asset.

In any of the embodiments, the method can be carried out such that the step of balancing includes balancing the amount of a non-United States derivative instrument as the amount of the derivative instrument.

In any of the embodiments, the method can be carried out such that the step of balancing includes balancing the amount of at least one member of the group consisting of a stock option, a stock index option and an option on a futures contract as the amount of the derivative instrument.

In any of the embodiments, the method can be carried out such that the step of balancing includes balancing the amount of a future as the amount of the derivative instrument.

In any of the embodiments, the method can be carried out such that the step of balancing includes balancing the amount of a swap as the amount of the interest-bearing asset.

In any of the embodiments, the method can be carried out such that the step of balancing includes balancing the amount of a short position in the amount of the derivative instrument.

In any of the embodiments, the method can be carried out such that the step of inputting transaction orders includes limit orders for interests in the fund.

In any of the embodiments, the method can be carried out such that the step of generating transactions data includes generating transactions data for limit orders for at least one from the group consisting of the interest-bearing asset and the derivative instrument.

In any of the embodiments, the method can be carried out such that the step of adjusting, with said apparatus, the relationship in response to changed market conditions.

In any of the embodiments, the method can be carried out such that the step of adjusting, with said apparatus, the relationship in response to changed regulations.

In any of the embodiments, the method can be carried out such that the step of adjusting, with said apparatus, the relationship in response to changed margin requirements.

In any of the embodiments, the method can be carried out such that the step of accounting includes calculating margin requirements and allocating an amount of funds for margin calls.

In any of the embodiments, the method can be carried out further including the step of calculating an amount of liquid funds to hold in reserve for the margin calls.

In any of the embodiments, the method can be carried out such that the step of balancing includes adjusting at least one of the respective amounts of the interest bearing asset and the derivative instrument to reflect transaction orders for the interests in the fund.

In any of the embodiments, the method can be carried out such that said classes include at least two different classes of the interests, the classes reflecting a difference in type of the interest-bearing asset, a difference in type of the derivative instrument, a difference in the relationship for each of the classes, and/or customizable classes prescribed by at least one member of a group consisting of the amount of the interest-bearing asset, the amount of the derivative instrument, and the relationship.

In any of the embodiments, the method can be carried out such that the amount of the interest-bearing asset is a customized portfolio of interest-bearing assets.

In any of the embodiments, the method can be carried out such that the amount of the derivative instrument is a customized portfolio of derivative instruments.

In any of the embodiments, the method can be carried out as further including the step of computerized managing at least one of said synthetic investment funds.

In any of the embodiments, the method can be carried out such that the step of accounting includes calculating, with said apparatus, margin requirements on combined long and short positions.

In any of the embodiments, the method can be carried out such that the step of balancing includes maintaining a constant weighted-average maturity for the derivative instrument.

In any of the embodiments, the method can be carried out as further including: providing a trading digital electrical computer apparatus including a trading digital computer having a trading processor, the trading processor electrically connected to a trading memory device for storing and retrieving machine-readable signals, to a trading input device for receiving trading input data and converting the trading input data into trading input electrical data, and to a trading output device for converting trading output electrical data into trading output having a trading visual presentation, the trading processor being controlled by a trading program to form trading circuitry in the trading processor for controlling the trading apparatus to receive the trading input data and to produce the trading output data; inputting, as a portion of the trading input data, transaction orders for the at least one member of the group consisting of the interest-bearing asset and the derivative instrument; determining a price for the at least one member of the group consisting of the interest-bearing asset and the derivative instrument; and generating output including trade confirmation documentation, including the determined price.

In any of the embodiments, the method can be carried out as further including: providing a broker's digital electrical computer apparatus including a broker's digital computer having a broker's processor, the broker's processor electrically connected to a broker's memory device for storing and retrieving machine-readable signals, to a broker's input device for receiving broker's input data and converting the broker's input data into broker's input electrical data, and to a broker's output device for converting broker's output electrical data into broker's output having a broker's visual presentation, the broker's processor being controlled by a broker's program to form broker's circuitry in the broker's processor for controlling the broker's apparatus to receive the broker's input data and to produce the broker's output data; inputting, as a portion of the broker's input data, transaction orders for the at least one member of the group consisting of the interest-bearing asset and the derivative instrument; and generating output including trade confirmation documentation, including prices respectively corresponding to the transaction orders.

In any of the embodiments, the method can be carried out as further including: providing an investment manager's digital electrical computer apparatus including an investment manager's digital computer having an investment manager's processor, the investment manager's processor electrically connected to an investment manager's memory device for storing and retrieving machine-readable signals, to an investment manager's input device for receiving investment manager's input data and converting the investment manager's input data into investment manager's input electrical data, and to an investment manager's output device for converting investment manager's output electrical data into investment manager's output having an investment manager's visual presentation, the investment manager's processor being controlled by an investment manager's program to form investment manager's circuitry in the investment manager's processor for controlling the investment manager's apparatus to receive the investment manager's input data and to produce the investment manager's output data; inputting, as a portion of the investment manager's input data, a definition for each said class of interests in the fund; inputting, as a further portion of the investment manager's input data, the recalculated holding data and the recalculated unit value respectively for each said class of interests in the fund; and generating output including the recalculated holding data and the recalculated unit value respectively for each said class of interests in the fund.

In any of the embodiments, the method can be carried out as further including: providing a reporting digital electrical computer apparatus including a reporting digital computer having a reporting processor, the reporting processor electrically connected to a reporting memory device for storing and retrieving machine-readable signals, to a reporting input device for receiving reporting input data and converting the reporting input data into reporting input electrical data, and to a reporting output device for converting reporting output electrical data into reporting output having a reporting visual presentation, the reporting processor being controlled by a reporting program to form reporting circuitry in the reporting processor for controlling the reporting apparatus to receive the reporting input data and to produce the reporting output data; inputting the recalculated holding data and the recalculated unit value for each said class of interests in the fund as the reporting input data; generating, from the reporting input data, a reformatted version of the reporting input data; communicating, by digital means, a transmission of the reformatted version of the reporting input data; and generating output at a recipient receiver device, the output including the reformatted version of the reporting input data.

In any of the embodiments, the method can be carried out as further including: providing an insurance company digital electrical computer apparatus including an insurance company digital computer having an insurance company processor, the insurance company processor electrically connected to an insurance company memory device for storing and retrieving machine-readable signals, to an insurance company input device for receiving insurance company input data and converting the insurance company input data into insurance company input electrical data, and to an insurance company output device for converting insurance company output electrical data into insurance company output having an insurance company visual presentation, the insurance company processor being controlled by an insurance company program to form insurance company circuitry in the insurance company processor for controlling the insurance company apparatus to receive the insurance company input data and to produce the insurance company output data; inputting the recalculated holding data and the recalculated unit value for each said class of interests in the fund as the insurance company input data; generating, from the insurance company input data, a reformatted version of the insurance company input data; communicating, by digital means, a transmission of the reformatted version of the insurance company input data; and generating output at a recipient receiver device, the output including the reformatted version of the insurance company input data.

In any of the embodiments, the method can be carried out as further including: inputting the recalculated holding data and the recalculated unit value for each said class of interests in the fund into a database for a variable annuity; calculating the funding of the variable annuity; and generating output at a recipient receiver device, the output including an asset value for the variable annuity.

In any of the embodiments, the method can be carried out such that further including: accounting for funding a portion of a variable annuity with assets of the synthetic investment fund.

Figure 6:
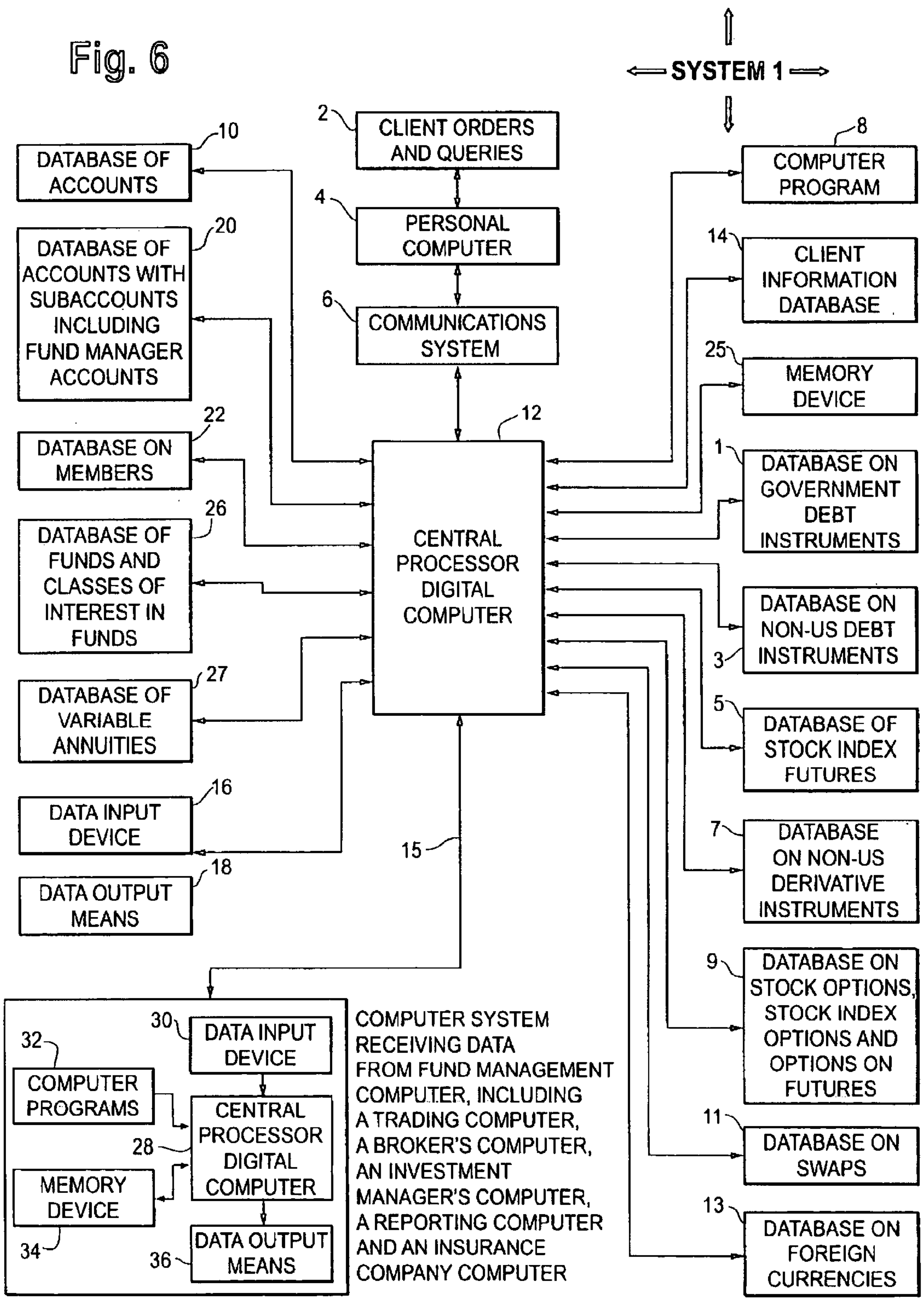
FIG. 6 is an illustration of an embodiment of the present invention.

Referring now to FIG. 6, an embodiment of the present invention is illustrated so as to indicate how to make and use the synthetic index fund system 1. At the heart of the invention is at least one digital computer 12, such as a server in a distributed network. The digital electrical computer 12 has a memory device for storing electronic output 24, such as a hard drive, diskette and disk drive, etc. The digital electrical computer 12 is connected to a communications system 6, such as the Internet, by such means as a modem. Terminals 4, such as PCs or dumb terminals can link to the communications system 6 to communicate with the digital electrical computer 12. Additionally, the digital electrical computer 12 is connected to a data input device 16, such as a keyboard, and data output means 18, such as a printer and/or monitor. The digital electrical computer 12 is controlled by a computer program 8.

Note that the computer program 8 is preferably in software, but can alternatively be wholly or partially in hardware. A software approach, e.g., the program stored on a diskette article of manufacture, provides a useful facility for inputting or storing data structures that are produced by the computer program 8, as well as for inputting a software embodiment of the present invention. Of course, storing the computer program 8 in a software medium is optional because the same result can be obtained by replacing the computer program 8 in a software medium with the computer program 8 in a hardware storage device, e.g., by burning the computer program 8 into a ROM, using conventional techniques to convert software into an ASIC or FPGA, etc., as would be readily understood by one having a modicum of skill in the arts of computer science and electrical engineering. (It is well known in the art of computer science that it is a trivial technical exercise to go from hardware to software or vice versa. See, for example, James R. Goodman, Todd E. Marlette, and Peter K. Trzyna, "The Alappat Standard for Determining That Programmed Computers are Patentable Subject Matter," J.P.T.O.S. October 1994, Volume 76, No. 10, pages 771–786, and James R. Goodman, Todd I. Marlette, and Peter K. Trzyna, "Toward a Fact-based Standard for Determining Whether Programmed Computers are Patentable Subject Matter," J.P.T.O.S. May 1995, Vol. 77, No. 5, pages 353–367, both of which are incorporated by reference.) In this regard, it should also be noted that "input" can include inputting data for processing by the computer program 8 or inputting in the computer program 8 code itself. The software embodiment is preferable for flexibility, but these approaches are equivalent.

The computer program 8 facilitates accessing as well as using a database of accounts 10; a database of accounts with sub-accounts, including fund manager accounts 20; a database on members 22; a database of funds and classes of interests in funds 26; a database of variable annuities 27; a client information database 14; a database on government debt instruments 1; a database on non-US debt instruments 3; a database of stock-index options 5; a database of non-US derivative instruments 7; a database on stock options, stock index options and options on futures 9; a database of swaps 11; and a database of foreign currencies 13.

The computer program 8 facilitates accessing as well as processing client orders and queries 2.

One or more second digital computers 28 with a central processor, memory device 34, input device 30, and output device 36 may be connected to the first digital computer 12. This second digital computer 28 is controlled by a second computer program 32. This second digital computer 28 obtains data 15 from the first digital computer 12. Possible second digital computers include a trading computer, a broker's computer, an investment manager's computer and an insurance company computer. Note that these second digital computers may share data with each other as well as with the first digital computer 12.

Referring now to FIG. 7, clients of the synthetic index fund first log on 40 to the system 1. The system 1 then checks 42 whether or not the client is authorized to use the fund. If the client is not authorized to use the fund, the client is referred to a nonmember menu 44. The nonmember menu 44 will allow the client to access investor and investment management information 46, broker-dealer information 48, and information on member sign-up 50. Upon signing up as a member, the client enters 52 member information and then is referred to a member menu 54.

If the client is authorized user, the client is referred to a member menu 54. One choice is to access a database 26 of funds and classes of interests in funds. A second choice is to access a database 10 of accounts. A third choice is to access a database 27 of variable annuities. A fourth choice is to access a database 20 of accounts with sub-accounts, including fund manager accounts. A fifth choice is to access a database 22 on members. A sixth choice is to access a database 62 of member information services. A seventh choice is order entry 64.

Turning now to FIG. 7-A, from step 64, the system 1 requires the client to enter 66 an account ID and password. The system 1 then determines 67 whether or not the account ID and password are valid. If no, the client is referred back to step 66. If yes, the client is referred to a transaction menu 68.

One choice is a buy order 70. If the client chooses this option, the system 1 requests the client to enter 72 purchase data. The system 1 then determines 74 whether or not buyer performance is assured. If buyer performance is not assured, the system 1 will require 76 assured performance before proceeding. If buyer performance is assured, the system 1 stores 78 the purchase order. The system 1 then determines 78 whether or not balancing criteria are met. If the balancing criteria are met, go to FIG. 8. If the balancing criteria are not met, system 1 goes to the member menu 54.

A second choice is a sell order 82. If the client chooses this option, the system 1 requests the client to enter 84 sale data. The system 1 then determines 86 whether or not seller performance is assured. If seller performance is not assured, the system 1 will require 88 assured performance before proceeding. If seller performance is assured, the system 1 stores 90 the sell order and goes to step 80.

A third choice is buy and sell 92. If the client chooses this option, the system 1 requests the client to enter 94 buy and sell data, which leads to FIG. 7-B.

A fourth choice is change specification 93 of custom class of interest. If the client chooses this option, the system 1 requests the client to enter 95 the revised specification, which leads to FIG. 7-C.

Turning now to FIG. 7-B, from step 94, the system 1 determines 96 whether or not buy and sell performance is assured. If buy and sell performance is not assured, the system 1 will require 98 assured performance before proceeding. If buy and sell performance is assured, the system 1 stores 100 the buy and sell orders and goes to step 80.

Turning now to FIG. 7-C, from step 95, the system determines 97 whether or not client performance is assured for the revised specification. If client performance is not assured, the system 1 stores 101 the revised specification and goes to step 80.

Referring now to FIG. 8, upon a yes at step 80 the system 1 inputs 102 current price data on all derivative instruments, inputs 104 current price data on all interest bearing assets, inputs 106 current foreign exchange rates, retrieves 108 the relationships for all classes of interests, including custom interests and calculates 110 unit values for all classes of interests, including custom interests.

The system 1 then retrieves 112 all investor holdings from the previous balancing period, and inputs 114 buy and sell orders from fund managers. Going to FIG. 8-A from step 114, the system 1 then retrieves 116 stored buy and sell orders and revised specifications for custom interests. The system 1 then calculates 118 new investor holdings after executing all buy and sell orders and revised specifications for custom interests.

The system 1 then calculates 120 the aggregate holdings of all derivative instruments required by the new investor holdings, retrieves 121 the current holdings of derivative instruments and calculates 122 the required purchases and sales of derivative instruments, including those required by maturity specifications.

The system 1 then calculates 124 the margin requirements for the derivative instruments. Going to FIG. 8-B from step 124, the system 1 allocates 126 funds for margin requirements and, if required, margin calls and calculates 128 the amount of liquid funds to hold in reserve for margin calls. The system 1 then calculates 130 the aggregate holdings of all interest-bearing assets required by the new investor holdings, margin requirements and reserves for margin calls. The system 1 then retrieves 132 the current holdings of all interest-bearing assets and calculates 134 the required purchases and sales of interest-bearing assets.

The system 1 then executes 136 the required purchases and sales of interest-bearing assets. Going to FIG. 8-C from step 136, the system 1 then stores 138 the executed prices for all interest-bearing assets, executes 140 the required purchases and sales of all derivative instruments and stores 142 the executed prices for all derivative instruments. The system 1 then calculates 144 the value of all assets held by the synthetic investment fund using executed prices, calculates 146 unit values for all classes of interests, including custom interests, using executed prices, calculates 148 a current balance sheet for the synthetic investment fund using executed prices and calculates 150 current investor holdings at executed prices.

Going to FIG. 8-D from step 150, system 1 calculates 152 all changes in investor holdings, including interest earned, gains and losses, purchases and sales, and changes in specifications of custom interests and calculates 154 amounts due to and due from investors. The system 1 then outputs 154 the balance sheet for the synthetic investment fund, outputs 156 current investor holdings and changes in holdings and unit values for all classes of interests. The system 1 then outputs 158 bills to investors for amounts due from them and payments for amounts due to them.

In the preferred embodiment of the present invention described herein, clients are able to place share orders 2 electronically using their PCs 4 and communicating with the central processor computer of system 1 through the Internet 6. The ability to place orders electronically and to invest in a variety of types of shares, including shares that short market indexes and invest in index options, will enable individual investors to utilize the fund as a medium to cost-effectively implement their personal investment strategies, including timing the market, hedging and locking in principal amounts (fixed in purchasing power or nominal dollars) while participating in potential market upsides.

Therefore, the preferred embodiment of the present invention will provide attractive new investment alternatives to investors who wish to trade the market indexes in a cost-effective manner and/or implement their own custom risk management strategies. At the same time the present invention will create a lower cost, potentially higher-return alternative for investors who simply wish to buy and hold certain market indexes. However, the ability to place orders directly with the fund via computer and the Internet will be most valuable for those investors who wish to utilize the fund to trade market indexes in a cost-effective manner and/or implement their own custom risk management strategies.

As an additional component of this electronic network, the preferred embodiment of the present invention includes connecting the first digital electronic computer 12 of system 1 to one or more second digital electronic computers 28. These second digital electronic computers 28 may include a trading computer, a broker's computer, a share owner's computer, a reporting agency's computer and an insurance company computer. In addition to sharing data with the first digital electronic computer, these second computer systems may share data with each other.

The insurance company utilize the synthetic investment fund to write variable annuities with the ability to offer superior investment performance and risk management. If so, the insurance company may provide and maintain the database 27 of variable annuities.

While a particular embodiment of the present invention has been disclosed, it is to be understood that various different modifications are possible and are within the true spirit of the invention, the scope of which is to be determined with reference to the claims set forth below. There is no intention, therefore, to limit the invention to the exact disclosure presented herein as a teaching of one embodiment of the invention.

We claim:

1. A computer-aided method for operating a synthetic investment fund having at least two different classes of interest, the method including the steps of:

forming the synthetic investment fund with a digital computer by entering data representing said at least two classes of interests and an amount of an interest-bearing asset, an amount of a derivative instrument, said amounts related by a mathematical relationship;

entering respective market prices for the interest-bearing asset and for the derivative instrument;

calculating a unit value for each said class of interests in the fund in response to the market prices; and generating output including holding data for each said class of interests in the fund and the unit value for each said class of interests in the fund.

2. The method of claim 1, further including:

balancing the amounts according to the relationship, responsive to the market prices; and generating transactions data, reflecting the balancing, for at least one of the interest-bearing asset and the derivative instrument as further output data.

3. The method of claim 2, wherein the step of entering respective market prices includes entering a constant maturity specification for the derivative instrument.

4. The method of claim 2, wherein the step of entering respective market prices includes entering a maturity specification for the derivative instrument.

5. The method of claim 4, further including:

inputting respective transaction orders for the classes of interests in the fund;

inputting updated price data for the interest-bearing asset and for the derivative instrument;

accounting for the transaction orders in generating revised holding data for each said class of interests in the fund;

recalculating the unit value for each said class of interests in the fund; and generating more output including the recalculated holding data and the recalculated unit value respectively for each said class of interests in the fund.

6. The method of claim 5, wherein the step of balancing is triggered by at least one member of the group consisting of time, change in time, price of the derivative instrument, a change in the price of the derivative instrument, a transaction order, and an amount of transaction orders.

7. The method of claim 5, wherein the step of accounting includes the steps of:

storing in a database the holding data for each said class of interests in the fund and the unit value for each said class of interests in the fund of respective investors;

retrieving some of the holding data from the database prior to carrying out the transaction orders for the interests in the fund;

adjusting the holding data after carrying out of the transaction orders;

storing the holding data reflecting the carried out transaction orders in the database; and generating the holding data reflecting the carried out transaction orders.

8. The method of claim 5, wherein the step of balancing includes changing an amount of a non-United States debt instrument as the amount of the interest-bearing asset.

9. The method of claim 5, wherein the step of balancing includes balancing an amount of a government debt instrument as the amount of the interest-bearing asset.

10. The method of claim 5, wherein the step of balancing includes balancing an amount of a non-United States derivative instrument as the amount of the derivative instrument.

11. The method of claim 5, wherein the step of balancing includes balancing an amount of at least one member of the group consisting of a stock option, a stock index option, and an option on a futures contract as the amount of the derivative instrument.

12. The method of claim 5, wherein the step of balancing includes balancing an amount of a future as the amount of the derivative instrument.

13. The method of claim 5, wherein the step of balancing includes balancing an amount of a swap as the amount of the interest-bearing asset.

14. The method of claim 5, wherein the step of balancing includes balancing an amount of a short position in the amount of the derivative instrument.

15. The method of claim 5, wherein the step of inputting transaction orders includes inputting limit orders for said classes of interests in the fund.

16. The method of claim 5, wherein the step of generating transactions data includes generating transactions data for limit orders for the derivative instrument.

17. The method of claim 5, further including the step of adjusting the relationship in response to changed market conditions.

18. The method of claim 5, further including the step of adjusting the relationship in response to changed regulations.

19. The method of claim 5, further including the step of adjusting the relationship in response to changed margin requirements.

20. The method of claim 5, wherein the step of accounting includes calculating margin requirements and allocating an amount of funds for margin calls.

21. The method of claim 20, further including the step of calculating an amount of liquid funds to hold in reserve for the margin calls.

22. The method of claim 5, wherein the step of balancing includes adjusting at least one of the respective amounts of the interest bearing asset and the derivative instrument to reflect the transaction orders for the classes of interests in the fund.

23. The method of claim 5, wherein the step of generating more output includes:

calculating aggregate holdings of all derivative instruments required by the transaction orders;

retrieving current holdings of all derivative instruments;

calculating required derivative instrument purchases and derivative instrument sales;

carrying out said transaction orders;

calculating margin requirements for the aggregate holdings;

allocating funds for the margin requirements and, if required, margin calls;

calculating an amount of liquid funds to hold In reserve for margin calls;

calculating aggregate holdings of all interest-bearing assets required by the transaction orders, margin requirements, and margin call reserves;

retrieving current holdings of all interest-bearing assets; and calculating required interest-bearing asset purchases and interest-bearing asset sales.

24. The method of claim 5, wherein said step of forming is carried out with said classes including a difference in type of the interest-bearing asset.

25. The method of claim 5, wherein said step of forming is carried out with said classes including a difference in type of the derivative instrument.

26. The method of claim 5, wherein said step of forming is carried out with said classes including a difference in the relationship.

27. The method of claim 5, wherein said step of forming is carried out with the classes including customizable classes, the customizable classes prescribed by a type of the interest-bearing asset, a type of the derivative instrument, and the relationship.

28. The method of claim 27, wherein said step of forming is carried out with the amount of the interest-bearing asset being an amount of a customized portfolio of interest-bearing assets.

29. The method of claim 27, wherein said step of forming is carried out with the amount of the derivative instrument being an amount of a customized portfolio of derivative instruments.

30. The method of claim 5, further including the step of computerized managing at least one of said synthetic investment funds.

31. The method of claim 5, wherein the step of accounting includes calculating margin requirements on combined long and short positions.

32. The method of claim 5, wherein the step of balancing includes maintaining a constant weighted-average maturity for the derivative instrument.

33. The process of claim 5, further including:

inputting some of said output from said digital computer into a trading computer, said output including transaction orders for the at least one member of the group consisting of the interest-bearing asset and the derivative instrument;

determining a price for the at least one member of the group consisting of the interest-bearing asset and the derivative instrument; and generating output including trade confirmation documentation, including the determined price.

34. The process of claim 5, further including:

inputting some of said output from said digital computer into a broker's computer, said output including transaction orders for the at least one member of the group consisting of the interest-bearing asset and the derivative instrument; and generating output including trade confirmation documentation, including prices respectively corresponding to the transaction orders.

35. The process of claim 5, further including:

inputting into said digital computer output from investment manager's computer, including a specification for each said class of interests in the fund;

inputting some of said output from said digital computer into the investment manager's computer, including the recalculated holding data and the recalculated unit value respectively for each said class of interests in the fund;

generating output including the recalculated holding data and the recalculated unit value respectively for each said class of interests in the fund.

36. The process of claim 5, further including:

inputting some of said output from said digital computer into a reporting computer, including the recalculated holding data and the recalculated unit value for each said class of interests in the fund;

generating, with the reporting computer, a reformatted version of the recalculated holding data and the recalculated unit value for each said class of interests in the fund;

communicating the reformatted version to a receiver device; and generating output at a recipient receiver device, the output including the reformatted version.

37. The process of claim 5, further including:

inputting some of said output from said digital computer into an insurance company computer, the output including the recalculated holding data and the recalculated unit value for each said class of interests in the fund;

generating, with the insurance company computer, a reformatted version of the recalculated holding data and the recalculated unit value;

communicating the reformatted version to a recipient receiver device for outputting.

38. The process of claim 37, further including:

inputting, with the insurance company computer, the recalculated holding data and the recalculated unit value for each said class of interests in the fund into a database for a variable annuity;

calculating, with the insurance company computer, the funding of the variable annuity; and generating output at the recipient receiver device, the output including an asset value for the variable annuity.

39. The method of claim 5, further including:

accounting for funding a portion of a variable annuity with at least one of said classes of interests in the synthetic investment fund.

* * * * *